United States Patent
Whalen-Robinson et al.

(10) Patent No.: US 9,962,833 B2
(45) Date of Patent: May 8, 2018

(54) SYSTEM AND METHOD FOR ADJUSTING END-EFFECTOR ACTUATION BASED ON RELATIVE POSITION WITH RESPECT TO GRAVITATIONAL FORCE

(71) Applicant: MOBILE TOOL MANAGEMENT, INC., Mukilteo, WA (US)

(72) Inventors: David James Whalen-Robinson, Mountlake Terrace, WA (US); Robert Allen Brown, Denver, CO (US); Chace Howard Fadlovich, Bothell, WA (US); Michael Gary Woogerd, Seattle, WA (US)

(73) Assignee: MTM ROBOTICS, LLC, Mukilteo, WA (US)

( * ) Notice: Subject to any disclaimer, the term of this patent is extended or adjusted under 35 U.S.C. 154(b) by 98 days.

(21) Appl. No.: 14/680,837

(22) Filed: Apr. 7, 2015

(65) Prior Publication Data
US 2016/0297073 A1   Oct. 13, 2016

(51) Int. Cl.
*B25J 9/16* (2006.01)

(52) U.S. Cl.
CPC .......... *B25J 9/1674* (2013.01); *B25J 9/1633* (2013.01)

(58) Field of Classification Search
CPC ... B25J 9/06; B25J 9/106; B25J 9/1638; B25J 9/1664; B25J 9/1055; B25J 9/1674; B25J 9/1633
See application file for complete search history.

(56) References Cited

U.S. PATENT DOCUMENTS

| | | | |
|---|---|---|---|
| 4,967,127 A | 10/1990 | Ishiguro et al. | |
| 5,081,593 A | 1/1992 | Pollack | |
| 5,103,404 A * | 4/1992 | McIntosh | A63B 24/00 318/568.22 |
| 5,248,007 A | 9/1993 | Watkins et al. | |
| 5,399,951 A | 3/1995 | Lavallee et al. | |
| 5,448,146 A | 9/1995 | Erlbacher | |
| 7,852,030 B2 * | 12/2010 | Kamiya | B25J 9/1674 318/273 |

(Continued)

OTHER PUBLICATIONS

International Search Report based on International Application No. PCT/US2016/026426, ISA/US, Alexandria, VA dated Jun. 24, 2016, pp. 15.

*Primary Examiner* — Adam R Mott
(74) *Attorney, Agent, or Firm* — Lane Powell, PC; Kevin D. Jablonski (57) ABSTRACT

A system and method for maneuvering a robotic end-effector using one or more motors that have a force limiter that is adaptable to take into account any effects of a changing gravitational force as the system moves. In one embodiment, the system includes an actuator, such as a drive motor, for applying a force vector to actuate a function of the end effector, such as moving the end-effector along a track that is attached to a contoured surface. Further, a force limiter coupled to the actuator is configured to interrupt the actuating if the force exceeds a first threshold. Further, the system includes an orientation detector to determine any changes in orientation with respect to gravity so as to adjust the force limit accordingly. Thus, if the force limiter determines that a threshold has been exceeded, the force limiter may limit or interrupt the motion while taking changing gravitational forces into account.

20 Claims, 4 Drawing Sheets

(56) References Cited

U.S. PATENT DOCUMENTS

| | | |
|---|---|---|
| 7,882,996 B2 | 2/2011 | Alessi et al. |
| 8,478,467 B2 | 7/2013 | Tang |
| 8,560,118 B2 | 10/2013 | Greer et al. |
| 8,601,897 B2 * | 12/2013 | Lauzier ................ B25J 17/0208 |
| | | 74/490.01 |
| 8,650,965 B2 * | 2/2014 | Hashiguchi ............ B25J 9/0087 |
| | | 73/763 |
| 8,924,010 B2 | 12/2014 | Riener et al. |
| 2005/0116673 A1 | 6/2005 | Carl et al. |
| 2010/0250177 A1 | 9/2010 | Van Acht et al. |
| 2011/0160745 A1 * | 6/2011 | Fielding ............. A61B 19/2203 |
| | | 606/130 |
| 2012/0203487 A1 | 8/2012 | Johnson et al. |
| 2012/0288356 A1 | 11/2012 | Lynch et al. |
| 2013/0011220 A1 * | 1/2013 | Jacobsen .................... B25J 3/04 |
| | | 414/2 |
| 2013/0013108 A1 | 1/2013 | Jacobsen et al. |
| 2013/0271046 A1 * | 10/2013 | Sussman ............. B25J 19/0004 |
| | | 318/379 |
| 2014/0067248 A1 | 3/2014 | Braunberger et al. |
| 2014/0118132 A1 | 5/2014 | Braunberger et al. |
| 2014/0163733 A1 | 6/2014 | Sadowski et al. |
| 2014/0251056 A1 * | 9/2014 | Preuss ..................... B25J 9/042 |
| | | 74/490.05 |

\* cited by examiner

SYSTEM AND METHOD FOR ADJUSTING END-EFFECTOR ACTUATION BASED ON RELATIVE POSITION WITH RESPECT TO GRAVITATIONAL FORCE

BACKGROUND

As manufacturing environments become more automated and complex, robotics and other automated machinery is becoming more and more prevalent in all phases of manufacturing. Very specific tasks that are conventionally performed by a skilled artisan may be performed by highly specialized robotics having highly specialized end effectors. For example, drilling holes in composite sections of a contoured section of an airplane wing may require a high level of precision with respect to applying torque to a motor for moving the end effector around a contoured wing surface. A further example is the need to tightly control the actuation force applied to the wing section by the drill bit in order to avoid compromising the wing itself.

In the past, a force limitation circuit or device has been employed to limit the force applied by a moving motor or an end effector actuator. However, as large end-effector/motor housing machines move around a contoured surface, the effect of gravity on the package changes. Thus a force required by the motor for moving the package upward along a contoured surface will be different than a force required for moving the same package downward. Therefore, a single force limitation parameter will not be sufficient for both scenarios.

BRIEF DESCRIPTION OF THE DRAWINGS

Aspects and many of the attendant advantages of the claims will become more readily appreciated as the same become better understood by reference to the following detailed description, when taken in conjunction with the accompanying drawings, wherein:

DETAILED DESCRIPTION

The following discussion is presented to enable a person skilled in the art to make and use the subject matter disclosed herein. The general principles described herein may be applied to embodiments and applications other than those detailed above without departing from the spirit and scope of the present detailed description. The present disclosure is not intended to be limited to the embodiments shown, but is to be accorded the widest scope consistent with the principles and features disclosed or suggested herein.

The subject matter disclosed herein is directed to a system and method for maneuvering a robotic end-effector using one or more motors that have a force limit that is adaptable to take into account any effects of a changing gravitational force as the system moves. In one embodiment, the system includes an actuator, such as a drive motor, for applying a force vector to actuate a function of the end effector, such as moving the end-effector along a track that is attached to a contoured surface of a manufactured item (an airplane wing, for example). Further, the embodiment includes a force limitation device coupled to the actuator and configured to interrupt the actuating if the force exceeds a first threshold. This is to ensure that if a foreign object is encountered, the force limiter may recognize a larger resistance in the motion path than what is expected. This may be due to a person or tool being in the motion path. Thus, if the force limitation device determines that a threshold has been exceeded for the force to move the end-effector, the force limitation device may interrupt the motion.

However, as foreshadowed in the background, as the orientation of the end-effector may change with respect to gravity, the force required to maneuver the end-effector may change significantly as the end-effector is typically heavy enough to affect the force required to move the end-effector "up" with respect to gravity as opposed to "down." Thus, in an embodiment, an orientation detector coupled to the actuator is configured to detect a change in an angle between a gravitational vector acting on the end effector and the force vector of the actuator. With this changing angle, an adjustor coupled to the force limitation device is configured to change the first threshold to a second threshold in response to the detected change in the angle. In this manner, the changing effects of the gravitational vector may be accounted for in the determination of the force limitation.

In other embodiments, the force limitation adjustment may be applied to other functions of an end-effector. In the past, various highly specialized robotics having highly specialized end-effectors may be set to employ a high degree of tolerance in the force limitations for movements and actuations. That is, if a resistive force is encountered that exceeds an expected limitation, an error may be present such that the end-effector cannot perform the intended function e.g., a drill is not positioned over plastic surface, but instead encounters a metal surface that provides more resistance than expected. However, as the end-effector moves its orientation from, for example, vertical to horizontal, the gravitational force adding to a downward drill motion contributes to an overall limitation. But if the same machine is positioned to drill horizontally, the same limitation will be different at least by an amount equal to the weight of the end-effector. Thus, the gravitational force that affects the actuation force may lead to differences the application of an actuation force for the end-effector manufacturing device.

These and other aspects of the subject matter disclosed herein are better understood with respect to the descriptions of FIGS. 1-5 below.

Figure 1:
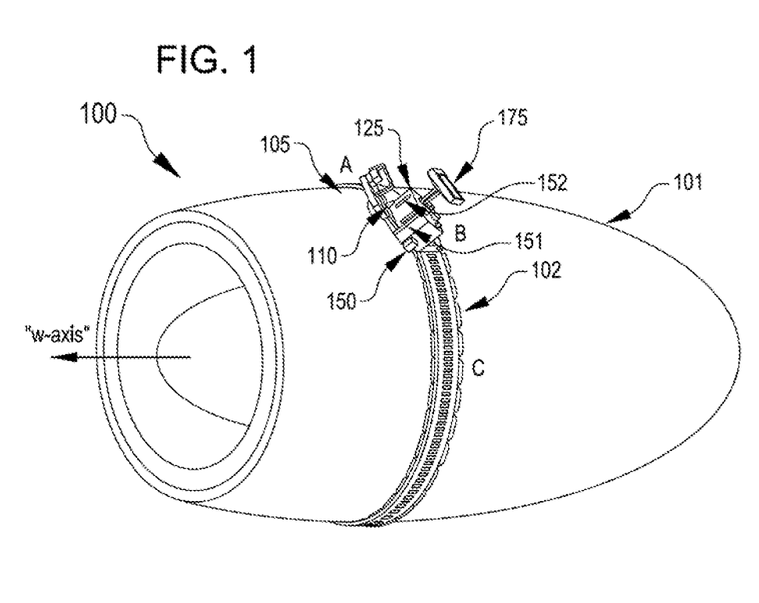
FIG. 1 shows a diagram of a track-mounted robotic manufacturing device having an end-effector mounted to a moveable frame suited for engaging a track system in a manufacturing environment according to an embodiment of the subject matter disclosed herein.

FIG. 1 shows a diagram of a system 100 having track-mounted robotic manufacturing device 105 having an end-effector 110 mounted to a moveable frame 125 suited for engaging a track-mount system 102 in a manufacturing environment according to an embodiment of the subject matter disclosed herein. As shown in this embodiment, the device 105 includes a first motor 150 for moving the entire device 105 along the track 102. This motor 150 is referred to as an x-axis motor 150 and the track 102, although placed upon the contour of the underlying manufactured item 101 (in this embodiment, a jet engine 101). The "x-axis" is a curved contour path that follows the curve of the track 102. Although this curved contour path is not an "axis" in the Cartesian sense, the relative relationship between the device 105 and the track 102 remains static and colinear, thus the terminology "x-axis" is used for the path which the device 105 follows when travelling along the track 102. The x-axis motor 150 may be actuated in a forward-manner or reverse-manner for moving the movable frame along the "x-axis," e.g., the track 102.

Further, the device 105 includes a second motor 151 that may maneuver the frame 125 and/or the end-effector 110 orthogonal to the x-axis. This degree of movement is referred to as the y-axis. In this manner, the second motor 151 may be actuated to move the end-effector 110 along the surface of the jet engine 101 in a direction orthogonal to the direction defined by the track 102. Further yet, the device 105 includes a third motor 152 hat may maneuver the frame 125 and/or the end-effector in manner orthogonal to both x and y axes. This degree of movement is referred to as the z-axis. In this manner, the third motor 152 may be actuated to maneuver the end-effector 110 away from or toward the surface of the jet engine 101.

Each motor 150, 151, and 152 of the device 105 is associated with a force limitation device (not shown in detail in FIG. 1) that is configured to limit the torque that each respective motor outputs. That is, the x-axis motor 150 includes an x-axis force limitation device, the y-axis motor 151 includes a y-axis force limitation device, and z-axis motor 152 includes a z-axis force limitation device. The force limitation device is designed to interrupt the motor from actuating should the overall device encounter an obstruction.

Each motor 150, 151, and 152 of the device 105 is also associated with an accelerometer (not shown in detail in FIG. 1) that is configured to determine changes in orientation of the device with respect to a gravitational normal force. In one embodiment, the x-axis motor 150 includes an x-axis accelerometer, the y-axis motor 151 includes a y-axis accelerometer, and z-axis motor 152 includes a z-axis accelerometer. In another embodiment, the device 105 includes one single accelerometer from which each motor controller may access and receive signals.

Figure 2A:
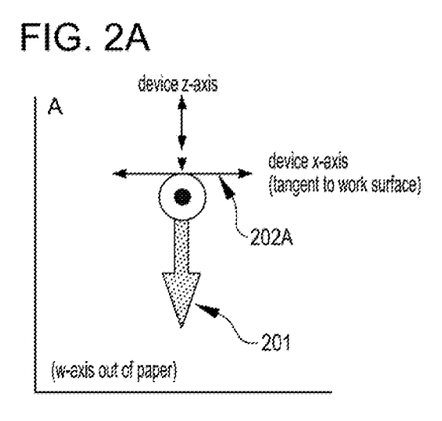
FIG. 2A-2C show a series of force diagrams having a relative direction of a force associated with an actuation direction of an end effector of the device of FIG. 1 over the course of time according to an embodiment of the subject matter disclosed herein.
Figure 2B:
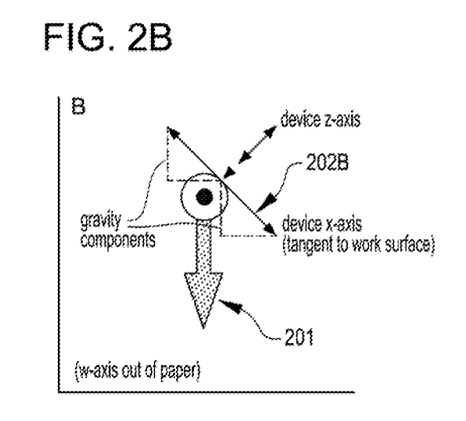
Figure 2C:
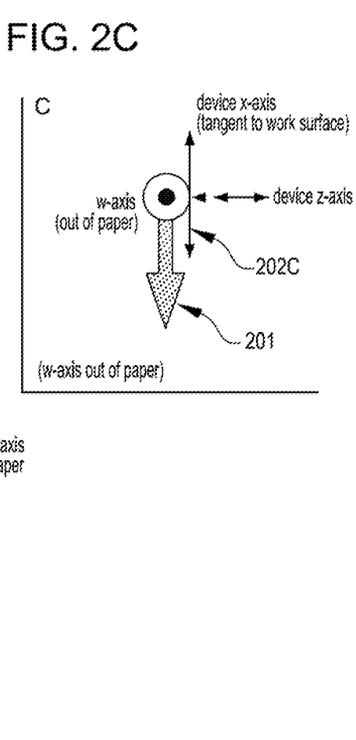

FIGS. 2A-2C show a force diagrams with respect to an x-axis or a y-axis to illustrate the effect of a gravitational normal force against the x-axis motor force according to embodiments of the subject matter. FIG. 2A corresponds to the forces associated with the device 105 of FIG. 1 when at position A as shown in FIG. 1. FIG. 2B corresponds to the forces associated with the device 105 of FIG. 1 when at position B as shown in FIG. 1. FIG. 2C corresponds to the forces associated with the device 105 of FIG. 1 when at position C as shown in FIG. 1. In each of these diagrams, the gravitational normal force 201 is shown as expected with a downward force.

Thus, in reviewing the differing positions that the device 105 may be, FIG. 2A shows the device as if it were at the top of the jet engine 101 at position A (FIG. 1). When in this position, the motor torque required to move the device along the x-axis is shown as force 202A. This force is perpendicular to the gravitational normal force 201. Therefore, the gravitational normal force 201 does not add nor subtract from the x-axis motor force. Therefore, at position A, the gravitational normal force does not affect the any force limitation that may be in place.

However, as the device 105 moves along the x-axis, the direction of the x-axis motor force begins to change. That is, the x-axis motor vector 202A rotates toward the gravitational normal force 201 until position B as shown in FIG. 2B and shown as x-axis motor vector 202B. As such, the x-axis motor vector is neither normal nor parallel to the gravitational normal force 201 and thus, the overall force needed to move the device 105 is increased or decreased by a component of the magnitude of the gravitational normal force 201. Lastly, at position C, FIG. 2C shows the x-axis motor vector almost aligned with the gravitational normal force 201 and thus, the overall force needed to move the device 105 is increased or decreased by the entire magnitude of the gravitational normal force 201.

In a conventional device 105, a conventional force limitation device that does not account for the gravitational normal force 201 may allow a larger torque from the x-axis motor 150 as the device 105 moves from position A to B to C. If an obstruction is encountered, the force limit will only be applied to the x-axis motor force. Thus, when the weight of the device 105 is added (i.e., the gravitational normal force 201), the resulting actual force is much greater than the intended limit. Therefore, as will be shown in the control systems of FIGS. 3 and 4, the gravitational normal force 201 is measured and considered when determine the force limitation on each axis motor.

Figure 3:
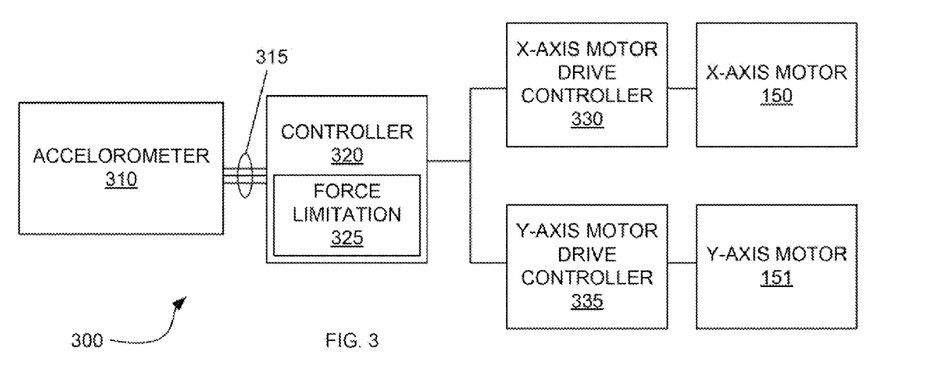
FIG. 3 shows a block diagram of a control block for controlling the actuation force for moving a device or moving the end effector of the system of FIG. 1 according to an embodiment of the subject matter disclosed herein.

FIG. 3 shows a block diagram of a control block 300 for controlling the actuation force a motor or end effector of FIG. 1 according to an embodiment of the subject matter disclosed herein. In this embodiment of FIG. 3, the controlled devices will be the x-axis motor 150 and y-axis motor 151. In this block diagram, a three-axis accelerometer 310 provides signal conditioned voltage outputs 315 to a supervisory controller 320 (simply a controller 320, hereinafter). In this embodiment, the accelerometer 310 measures acceleration with a minimum full-scale range of ±3 g where: "g" is standard gravity=9.80665 m/s$^2$. and produces a control output voltage signal. In one embodiment, the accelerometer 310 measures static acceleration of gravity in tilt-sensing applications. In another embodiment, the accelerometer 310 measures dynamic acceleration resulting from motion, shock, or vibration.

The controller 320 in the control block 300 is responsible for overall management of the states and operations. The controller may include circuitry and programming for handling the positioning of an end-effector, initiating and handling the functionality of the end-effector, communications with larger control systems responsible for an entire manufacturing line, as well as the functions currently being discussed—the control of the motor for maneuvering the device 105 along a track 102. The controller 320 may be configured to interface with the motion controllers, various discrete peripherals (analog and digital), as well as the pendant computing device 175 (as shown in FIG. 1) which is used for human interaction with the device 105. The controller 320 is configured to receive one or more of the control signals from the accelerometer 310.

The controller 320 includes a communication and control coupling to each motor drive controller under the control of the supervisory controller 320. In the embodiment of FIG. 3, the controller is coupled to an x-axis drive controller 330 as well as a y-axis motor drive controller 335. This communicatively coupling may be a serial communications connection such as an RS-232 standard serial connection. In other embodiments, this communicative coupling may be a parallel communication couplings or a wired or wireless Ethernet coupling. In turn, each drive controller 330 and 335 is respectively coupled to a drive (motor), e.g., the x-axis drive controller 330 is coupled to the x-axis motor 150 and the y-axis drive controller 335 is coupled to the y-axis motor 151.

In the embodiment of FIG. 3, the x-axis motor 150 and the y-axis motor 151 are controlled by digital motion drive controllers 330 and 335, respectively that feature current, velocity, and position control loops and a wide range of commutation types and position feedbacks. Position feedback may be provided by an internal optical incremental encoder (not shown) within the motor housing. Each motor may be driven based upon commands from a respective drive controller 330, 335, which in turn receives system-wide operational commands from the supervisory controller 320. Electrical power for the motors 150, 151 may be derived from a system-wide DC or AC motor bus (not shown) which is conditioned by the drive controllers 330, 335.

Thus, the controller 320 receives control signals 315 from the accelerometer 310 that influence the control signals from the controller 320 sent to each respective drive controller 330, 335. If the accelerometer 310 detects that the device 105 is moving from A-B-C (as shown in FIG. 1), or in any other manner where the direction of the x-axis motor force is changing with respect to the direction of the gravitational normal force, the controller 320 adjusts the force limitation device 325 so as to account for the changing angle between these respective force vectors.

Figure 4:
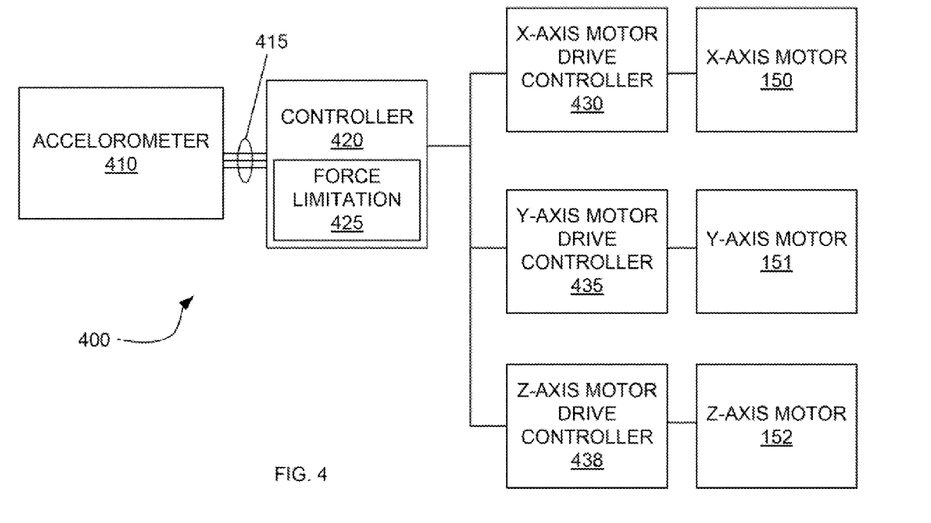
FIG. 4 shows another block diagram of a control block for controlling the actuation force for moving a device or moving the end effector of the system of FIG. 1 according to an embodiment of the subject matter disclosed herein.

FIG. 3 is directed to an embodiment having two different motors and respective drive controllers that are configured to move the overall device 105 in one of two cardinal directions (an x-axis and a y-axis). FIG. 4, described next, adds an additional direction of control.

FIG. 4 also shows a block diagram of a control block 400 for controlling the actuation force a motor or end effector of FIG. 1 according to an embodiment of the subject matter disclosed herein. In this embodiment of FIG. 4, the controlled devices will be the x-axis motor 150, the y-axis motor 151 and a z-axis motor 152. In this block diagram, a three-axis accelerometer 410 provides signal conditioned voltage outputs 415 to a supervisory controller 420.

The controller 420 in the control block 400 is responsible for overall management of the states and operations of the device 105. Again, the controller 420 may include circuitry and programming for handling the positioning of an end-effector, initiating and handling the functionality of the end-effector, communications with larger control systems responsible for an entire manufacturing line, as well as the control of the motors for maneuvering the device 105 along a track 102. The controller 420 is configured to receive one or more of the control signals from the accelerometer 410.

The controller 320 includes a communication and control coupling to each motor drive controller 430, 435, and 438 under the control of the supervisory controller 420. In the embodiment of FIG. 4, the controller 420 is coupled to an x-axis drive controller 330, a y-axis motor drive controller 335, and a z-axis drive controller 438. This communicatively coupling may be a serial communications connection such as an RS-232 standard serial connection. In other embodiments, this communicative coupling may be a parallel communication couplings or a wired or wireless Ethernet coupling. In turn, each drive controller 430, 435 and 438 is respectively coupled to a drive (motor), e.g., the x-axis drive controller 430 is coupled to the x-axis motor 150, the y-axis drive controller 435 is coupled to the y-axis motor 151, and the z-axis drive controller 438 is coupled to the z-axis motor 152.

In the embodiment of FIG. 4, the x-axis motor 150 and the y-axis motor 151 are controlled by digital motion drive controllers 430 and 435, respectively that function as described above with respect to FIG. 3. Further, the z-axis drive controller 438 may be used to control another function of the device, for example, a drilling motion of an end effector 110. Thus, a z-axis motor 152 may also be driven based upon commands from the respective drive controller 438, which in turn receives system-wide operational commands from the supervisory controller 420. Electrical power for the z-axis motor 152 may also be derived from a system-wide DC or AC motor bus (not shown).

Thus, the controller 420 receives control signals 415 from the accelerometer 410 that influence the control signals from the controller 420 sent to each respective drive controller 430, 435, and 438. If the accelerometer 410 detects that the device 105 is moving from A-B-C (as shown in FIG. 1), or in any other manner where the direction of one or more of the axes motor force is changing with respect to the direction of the gravitational normal force, the controller 420 adjusts the force limitation device 425 of the appropriate drive controller signal so as to account for the changing angle between these respective force vectors.

The force limitation device (325 of FIG. 3 and 425 of FIG. 4) includes a software based algorithm for implementing the respective drive control signals to each drive controller and depends on the current-sensing capabilities of the motors 150, 151, and 152 in the systems 300 and 400. Motor current is directly proportional to motor torque and, therefore, directly proportional to the force vector being applied to move the device 105 in a respective x-, y-, or z-axis manner. The drive controllers are devices which combine power amplification and closed-loop motor control logic to generate a control signal for driving a respective motor. A power amplification circuit electrically senses the current being applied to the respective motor coils and this measurement can be read directly from the drive controller via the controller portion of the drive. The system 300/400 uses the supervisory controller 320/420 to read and write current (torque) parameters on the motor drive controllers.

Finally, because the device 105 can be deployed in various spatial orientations (horizontal, vertical, etc.) in a number of different manufacturing environments, it is convenient to monitor the spatial orientation of the machine in order to compensate any torque limits that are imposed on the motor drives in any drive signal corresponding to a directional force vector. For example, if the device 105 is installed in a vertical orientation, then it will require more force to move the device 105 upward along the device's x-axis than it will to move the device 105 downward along the device's x-axis. This is because gravity (e.g., the gravitational normal force) is acting in opposite directions for upward and downward moves. As another example, if the device 105 is installed in a horizontal orientation, then gravity is not acting on the device's x-axis, and the force required to move it along the device's x-axis will be the same in +x and −x directions. This orientation relative to gravity also occurs for the device's y-axis and therefore the force limitation device 325/425 monitors x-, y-, and z-axis motors for gravity orientation and apply appropriate compensation to the force limitation algorithms.

Figure 5:
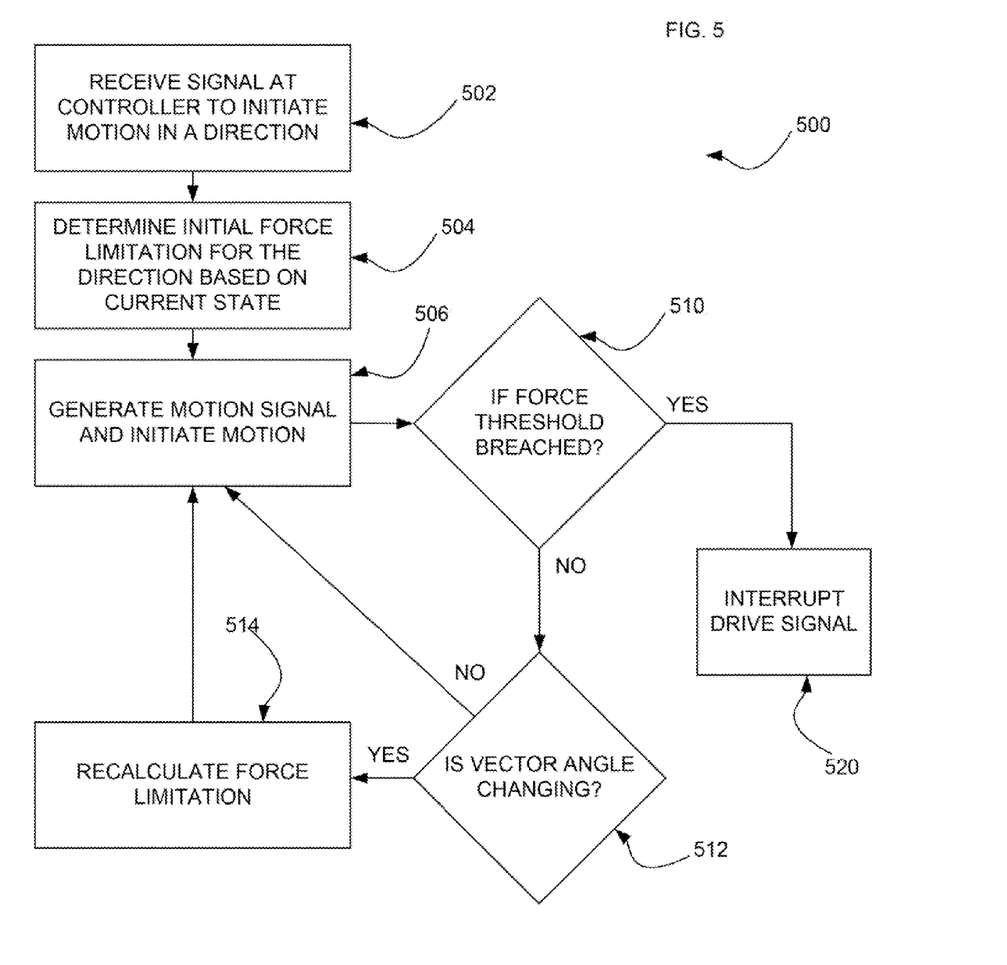
FIG. 5 shows a flow chart of a method for controlling the actuation force for moving a device or moving the end effector of the system of FIG. 1 according to an embodiment of the subject matter disclosed herein.

FIG. 5 shows a flow chart 500 of a method for controlling the actuation force for moving a device or moving the end effector of the system of FIG. 1 according to an embodiment of the subject matter disclosed herein. The method underlying the flow chart 500 may be implemented using software modules, hardware modules, or any combination thereof.

In one embodiment, the method utilizes systems and devices as described with respect to FIGS. 1-4 under the control of a software-based algorithm. As such, two sensor and computing components comprise the drive controllers, and the supervisory controller receives and generates control signals for controlling various motors. Furthermore, both of these computing and control components may be managed through an overall parameter set in the control algorithm called Object Identification (OID). The OID is an extensive set of messages and objects that can be used to define and retrieve the behavior of the device 105 in various aspects, and there is a subset of OID that are specific to the respective force limitation systems (FLS, hereinafter). In one embodiment, the FLS OID is managed by the drive controllers while in a different embodiment, the FLS OID is managed by the supervisory controller. Thus, within the context of the flow chart, a controller may receive a control signal, at step 502, to initiate motion in one or more direction under the control of the one or more motors.

In a first embodiment, the drive controllers (e.g., drive controller 325 as shown in FIG. 3) may use several firmware parameters to implement a control algorithm for limiting motor current (and therefore motor force), speed, and position of a respective driven motor. As such, an initial motor controller current limit may be established at step 504 based on current motor position and state. This initial limit may have a safe-start period assuming that any initial movement of any motor will exhibit a start-up current spike. Thus, a motion signal is generated for driving the specific motor at step 506. After starting, the current control loop of the drive controller may update periodically at a rate suitable for the elements being controlled (e.g., every 90 usec). During these periodic updates, the drive controller determines if the current threshold is breached at decision step 510 and if the force vector angle has changed based upon input from the accelerometer at decision step 512. If the vector angle has changed, then a new current limit threshold is established via calculation at step 514. This entire process repeats periodically (e.g., every 90 usec) unless the current limit is breached, in which case the drive current signal is interrupted at step 520.

These various control parameters (e.g., the torque limits, the update time period, and the like) may be changed and/or updated accordingly via a supervisory controller or some other controller. These parameters may be maintained in an embedded memory of a respective drive controller and are sensed periodically (e.g., every 90 usec) via a current control loop. In this embodiment, the software algorithm may the utilize the following control parameters:

OID MC CURRENT LIMITS—This sets the continuous current limits for the motors through a "current limit" ("CL[1]") input parameter on the drive controllers and an MCCurrentLimit parameter on the supervisory controller. After a short period of torque demands higher than CL[1], the torque command limit is decreased to CL[1], thereby enforcing force limitation. The CL parameter sets the continuous current limit for the drive controller.

OID MC PEAK CURRENT LIMITS—This sets the peak current limits for the motors through a "peak limit" ("PL[1]") input parameter on the drive controllers and the MCPeakCurrentLimit parameter on the supervisory controller. If the current command (torque demand) has been raised to PL[1] from zero, and after the time specified for peak duration, the motor current command will be limited to CL[1]. The PL parameter sets the peak current limit for the drive controller.

OID MAX SPEED X and OID MAX SPEED Y—These set the maximum command and feedback limits of the respective motor through HL, LL, VH, VL parameters on the drive controllers and an MCErrorLimits parameter on the supervisory controller. These parameters set the following aspects of the drive controller: high over-speed limit (HL), low under-speed limit (LL), high velocity command limit (VH), low velocity command limit (VL).

OID POSNERR LIMIT—This sets the position error limits for the motors through a "position error" ("PE") parameter on the drive controllers and the MCErrorLimits parameter on the supervisory controller. Position error limit can be set as low as 0.001 inch.

OID VELERR LIMIT—This sets the velocity error limits for the motors through a VE parameter on the drive controllers and an MCErrorLimits parameter on the supervisory controller.

In another embodiment, the supervisory controller may be configured to manages the following OID parameters to support a force limitation subsystem.

OID FORCE SENSOR CALIBRATION—This OID is used for calibrating and zeroing the accelerometer's gravity readings. This OID contains the following fields:
    int16 ZeroX;
    int16 ZeroY;
    int16 ZeroZ;
    int16 CountsPerGX;
    int16 CountsPerGY;
    int16 CountsPerGZ;

The "Zero" fields are analog-to-digital values that represent zero force due to gravity when that axis is not coaxial with the gravitational normal force. The "CountsPerG" fields are analog-to-digital values that represent digital counts per one g of gravity when that axis is coaxial with the gravitational normal force. The force could be positive or negative because it could point up or down. For example, with X+up, a positive CountsPerG value should result. The g force is in the opposite direction, so this is really the number of g to counteract the gravitational normal force.

OID_FORCE_SENSOR—This OID is used to read the resulting forces in the various axes. This OID contains the following fields:
    float X;
    float Y;
    float Z;
    uint8 ErrFlag;

X, Y, and Z are the real-time gravity forces on those respective axes. If ErrFlag is set to 1, then the numbers are too far from unit vector scaling and the system will not use them because they are inaccurate in such a scenario.

OID_FORCE_LIMITS—This OID determines how the FLS adjusts force limits, in the form of motor current, as applied to the motors. This OID contains the following fields:
    uint16 SensorInterval;
    uint8 Active;
    uint8 CurrentUnderMethod;
    uint16 CurrentOverX;
    uint16 CurrentUnderX;
    uint16 CurrentOverY;
    uint16 CurrentUnderY;
    uint16 FullGravX;
    uint16 FullGravY;

uint16 FlatForceX;
uint16 FlatForceY;
These individual fields are discussed below, but only for the X axis component for brevity (all axes are monitored and controlled in parallel, identical fashion):

SensorInterval—controls how many milliseconds between readings of the force sensor. This takes effect even when not applying force limits. The default update rate of 1000 ms is adequate.

Active—When this is set to 0, force limiting caused by current limiting is not active. The drive controllers will still get updated every 1000 msec, but will be updated with the force limits that are defined by the continuous and peak current limit parameters (CL and PL parameters on the drive controllers, and MCCurrentLimit and MCPeakCurrentLimit on the supervisory controller).

CurrentOverX—The number of milliamps (mA) that should be applied as a maximum over gravity amps for X.

CurrentUnderX—The number of milliamps (mA) that should be applied as a minimum under gravity amps for X.

FullGravX—The number of milliamps that would be ideal for a holding current against 1 g on the x-axis In yet other embodiments, the control block may operate in one of two modes; the first mode is an inactive and the second mode is an active mode.

FLS Inactive—This mode is in effect when ForceLimits.Active (OID_FORCE_LIMITS.Active) is set to zero. In this mode, the continuous current limit OID is used to set the CL parameter of a drive controller and the peak current limit OID is used to set the PL parameter of the drive controller. Additionally, two more software variables may be used as the main FLS current (force) limits are set to be 1.0 amp higher (for "positive" moves) and 1.0 amp lower (for "negative" moves) than the peak, which effectively turns off those limits. Below is pseudocode of the software logic used when ForceLimits.Active is zero:

```
imcl = MCCurrentLimit.fX;      // imcl sets CL on Motor Drive
                                  Controller
impl = MCPeakCurrentLimit.fX;  // impl sets PL on Motor Drive
                                  Controller
iqmh = impl + 1;               // iqmh is high limit for FLS, add 1 to disable
iqml = -impl - 1;              // iqml is low limit for FLS, subtract 1 to
                                  disable
```

FLS Active—This mode is in effect when ForceLimits.Active (OID_FORCE_LIMITS.Active) is set to one. In this mode, the main FLS current (force) limits are calculated from the gravity sensor and used to set the Motor Drive Controller's CL and PL parameters. If the force sensor error flag is one (ForceSensor.ErrFlag), then it will not set the limits at all. Below is pseudocode of the software logic used when ForceLimits.Active is one (shown only for the X axis . . . Y axis implements parallel and analogous software):

```
// fg is the gravity force from the accelerometer, always less than one
fg = g_ForceSensor.fX // set fg to the X component of the multi-axis
sensor
IF (fg > 1.0) THEN fg = 1.0
// f is the force to hold the machine,
// with fg as a factor * gravity mA * (1A/1000mA)
f = (fg * FullGravX) / 1000.0;
// the math depends on gravity (fg) relative to the machine
IF (fg >= 0) THEN
    //Set the torque limits to hold at f, plus/minus the FLS limits
    iqmh = f + (CurrentOverX / 1000.0);
    iqml = f - (CurrentUnderX / 1000.0);
    imcl = iqmh; // imcl sets CL[1] on Motor Drive Controller
    impl = iqmh; // impl sets PL[1] on Motor Drive Controller
    // the Motor Drive Controller's CL and PL are triggered first to
detect over-force
    // so we can disable iqmh by including a margin of 1.0
    iqmh = iqmh + 1;
ENDIF
IF (fg < 0) THEN
    //Set the torque limits to hold at f, plus/minus the FLS limits
    iqmh = f + (CurrentUnderX/1000.0);
    iqml = f - (CurrentOverX/1000.0);
    imcl = -iqml; // imcl sets CL[1] on Whistle
    impl = -iqml; // impl sets PL[1] on Whistle
    // the Motor Drive Controller's CL and PL are triggered first to
detect over-force
    // so we can disable iqml by including a margin of 1.0
    iqml = iqml - 1;
ENDIF
// enforce the system-wide limits
IF (imcl > MCCurrentLimit.fX) THEN imcl = MCCurrentLimit.fX;
IF (impl > MCPeakCurrentLimit.fX) THEN impl =
MCPeakCurrentLimit.fX;
```

By setting the current, accelerations, and decelerations properly, typical moves will have no problem, but moves which start to require forces outside of the range specified will be terminated at step 520.

While the subject matter discussed herein is susceptible to various modifications and alternative constructions, certain illustrated embodiments thereof are shown in the drawings and have been described above in detail. It should be understood, however, that there is no intention to limit the claims to the specific forms disclosed, but on the contrary, the intention is to cover all modifications, alternative constructions, and equivalents falling within the spirit and scope of the claims.

What is claimed is:

1. An end effector, comprising:
    an actuator configured to generate a force vector to actuate a function in response to a received control signal, the actuator integral with the end-effector and configured to be maneuvered along a non-linear path with the end-effector;
    a force limiter coupled to the actuator and configured to interrupt the actuating if the force vector exceeds a first threshold;
    an orientation detector coupled to the actuator and configured to detect a change in an angle between a gravitational vector acting on the end effector and the force vector;
    wherein the force limiter is configured to change the first threshold to a second threshold in response to the detected change in the angle; and
    wherein the end effector is configured to maneuver on a non-linear track mounted to an underlying manufactured item along the non-linear path.

2. The end-effector of claim 1, wherein the actuator comprises a motor for moving the end-effector laterally.

3. The end-effector of claim 1, wherein the actuator comprises a tool for altering a manufactured item.

4. The end-effector of claim 1, further comprising a controller configured to generate the control signal and configured to imitate the actuating.

5. The end-effector of claim 1, further comprising:
    a second actuator configured to generate a second force vector to actuate a second function in response to a second received control signal;

a second force limiter coupled to the second actuator and configured to interrupt the actuating if the second force vector exceeds a third threshold.

6. The end-effector of claim 5 wherein the second force limiter is configured to change the third threshold to a fourth threshold in response to a detected change by the orientation detector in an angle between the second force vector and the gravitational vector.

7. The end-effector of claim 1, further comprising:
a third actuator configured to generate a third force vector to actuate a third function in response to a third received control signal;
a third force limiter coupled to the third actuator and configured to interrupt the actuating if the third force vector exceeds a fifth threshold.

8. The end-effector of claim 7 wherein the third force limiter is configured to change the fifth threshold to a sixth threshold in response to a detected change by the orientation detector in an angle between the third force vector and the gravitational vector.

9. A system, comprising:
a frame having an end effector, the frame movably coupled to a contoured track having a non-linear motion path about an underlying manufactured item;
a first drive controller coupled to a first drive that is disposed in the frame, the first drive controller configured to generate a first drive vector;
a second drive controller coupled to a second drive that is disposed in the frame, the second drive controller configured to generate a second drive vector; and
a supervisory controller disposed in the frame and configured to generate control signals for controlling the first and second drive controllers, the supervisory controller further including
a respective force limiter coupled to each respective drive controller and configured to alter the respective control signal to the respective drive controller if the respective drive vector exceeds a first threshold;
an orientation detector coupled to each respective force limiter and configured to detect a change in an orientation angle between a gravitational vector acting on the system and a respective drive vector such that the force limiter is configured to change the first threshold to a second threshold in response to a detected change in the orientation angle.

10. The system of claim 9 wherein the orientation detector comprises a three-directional accelerometer.

11. The system of claim 9 wherein the first and second drives comprises single-phase motors.

12. The system of claim 9 wherein the first drive is configured to move the system along a first axis of motion and the second drive is configured to move the system along a second axis of motion that is different than the first axis of motion.

13. The system of claim 12 wherein the first axis comprises a contoured path axis and the second axis comprises a linear axis.

14. The system of claim 9, further comprising a third drive controller coupled to a third drive, the third drive controller configured to generate a third drive vector.

15. A method, comprising:
maneuvering a frame having an actuator for a machine along a non-linear path along a track mounted to an underlying manufactured item;
detecting a first change in orientation of an actuation vector of the actuator with respect to a gravitational normal force;
adjusting a force limitation parameter of the actuator in response to the change in orientation; and
arresting actuation of actuator in response to a force corresponding to the actuation of the actuator exceeding the force limitation parameter.

16. The method of claim 15, further comprising interrupting generating force corresponding to the actuation of the actuator if the force corresponding to the actuation exceeds the adjusted force limitation.

17. The method of claim 16 wherein the interrupting comprises disconnecting a power supply bus that is supplying power to the actuator.

18. The method of claim 15, further comprising:
detecting a second change in orientation of the actuation vector of the actuator with respect to a gravitational normal force after detecting the first change; and
adjusting the force limitation parameter of the actuator in response to the second change in orientation.

19. The method of claim 18, further comprising:
determining that the force corresponding to the actuation does not exceed the force limitation that was adjusted after the first detected change;
determining that the force corresponding to the actuation exceeds the force limitation that was adjusted after the second detected change; and
interrupting the actuation after the second detected change.

20. The method of claim 15, further comprising:
detecting a change in orientation of a second actuation vector of a second actuator of the machine with respect to the gravitational normal force; and
adjusting a force limitation parameter of the second actuator in response to the change in orientation.

* * * * *